United States Patent [19]
Petersen

[11] 3,965,972
[45] June 29, 1976

[54] HEATING AND COOLING SYSTEM
[76] Inventor: Ross K. Petersen, 2974 W. River Road, Minneapolis, Minn. 55406
[22] Filed: Nov. 4, 1974
[21] Appl. No.: 520,270

[52] U.S. Cl. .................................. 165/45; 165/48; 62/260; 237/1 A; 126/271
[51] Int. Cl.$^2$ ........................................... F28D 7/00
[58] Field of Search .................. 165/45, 48; 62/260; 237/1 A; 126/400, 271

[56] References Cited
UNITED STATES PATENTS

| | | | |
|---|---|---|---|
| 2,461,449 | 2/1949 | Smith et al. | 165/45 |
| 2,513,373 | 6/1950 | Sporn et al. | 165/45 |
| 2,553,302 | 5/1951 | Cornwall | 237/1 A |
| 2,584,573 | 2/1952 | Gay | 165/45 |
| 3,799,145 | 3/1974 | Butterfield | 237/1 A |
| 3,812,903 | 5/1974 | Thomason | 165/48 |

FOREIGN PATENTS OR APPLICATIONS

| | | | |
|---|---|---|---|
| 422,814 | 6/1947 | Italy | 165/45 |
| 248,161 | 1/1948 | Switzerland | 165/45 |

Primary Examiner—Albert W. Davis, Jr.
Assistant Examiner—James D. Liles
Attorney, Agent, or Firm—Burd, Braddock & Bartz

[57] ABSTRACT

An environment heating and cooling system comprising a solar collector, heat storage ground well, cold storage ground well and a heat exchange apparatus. Water from a cold storage ground well is heated in the heat exchange apparatus by solar heating fluid heated in a solar collector. The heated water is stored in a heat storage ground well. Water from the heat storage ground well heats the ambient environment when the solar collector requires supplementation. Water from the cold storage ground well is used to cool the ambient environment. In addition, water from both ground wells serves ordinary household purposes as drinking, bathing and the like.

27 Claims, 6 Drawing Figures

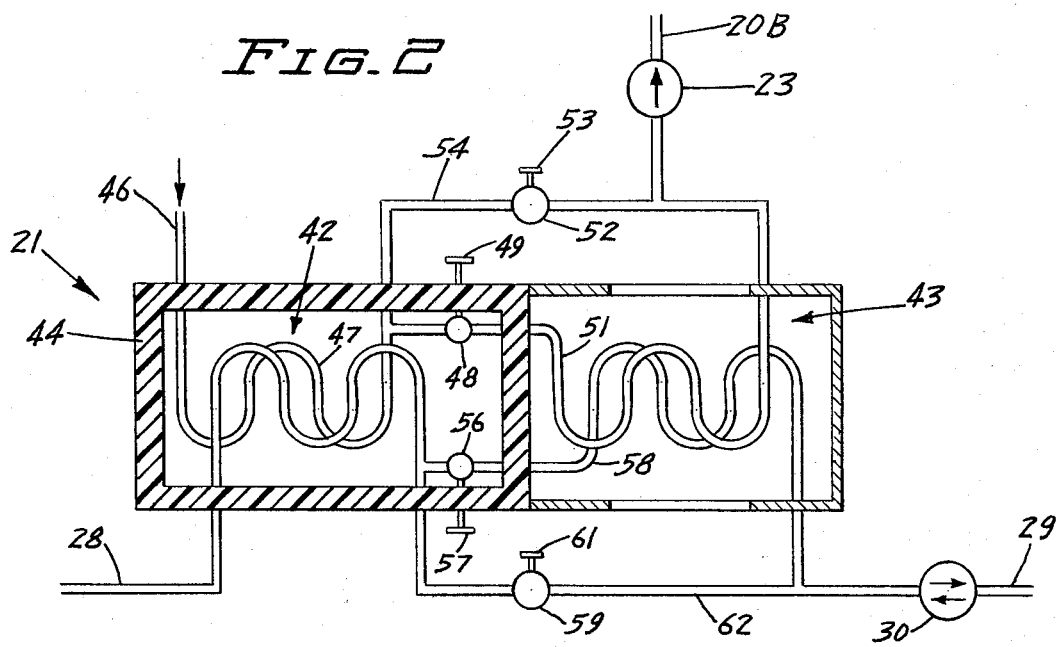
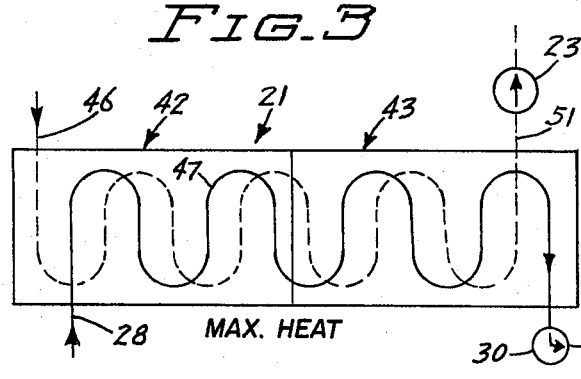
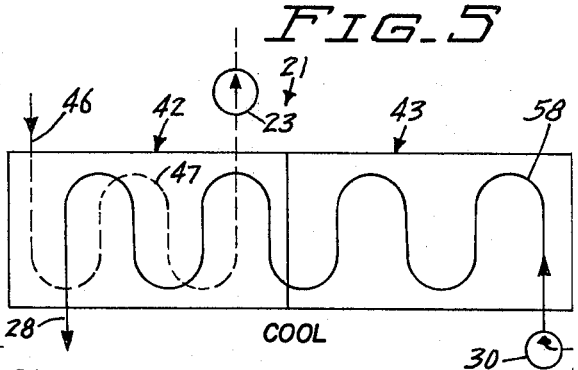
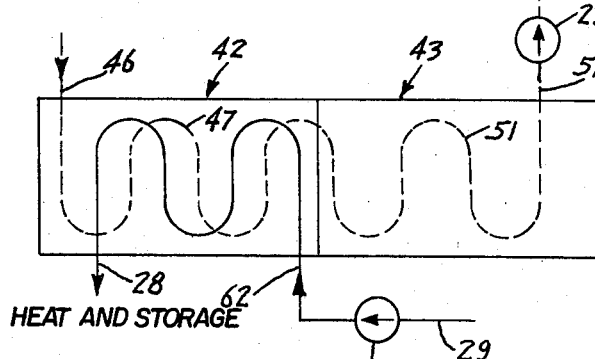
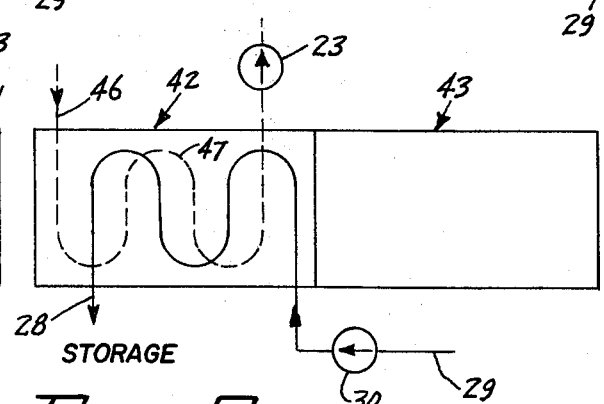

HEATING AND COOLING SYSTEM

BACKGROUND OF INVENTION

The rising cost and short supply of fossil fuels have stimulated interest in alternate sources of energy for space heating and cooling. Heating a structure with solar energy is not new. Embodiments of this idea have been conceived and put to use well before this century. The intermittent nature of solar radiation, however, requires either an auxiliary heating system or a method of storing solar heat energy for later use.

One of parameters parametes of a solar energy system is the size of the heat storage tank. In energy systems using water, the parameter is the size of the water tank where solar energy is stored in the form of heat. The size of the tank affects the rate of heat absorption and this rate is in turn dependent upon available solar radiation. Various methods of heat storage have been utilized with limited success. A solar heating system using an underground tank is shown by Cornwall in U.S. Pat. No. 2,553,302. Systems of underground pipes and lines to store heat are shown by Gay in U.S. Pat. No. 2,584,573 and Hervey in U.S. Pat. No. 3,339,629. Tanks of water and water lines in beds of rock or gravel will readily store enough heat for 1 or 2 days. Larger capacity tanks and lines are not economically feasible. The principal feature of these closed systems is an expansive underground network of piping or tubing and a heat transfer fluid which is circulated through the piping in order to add heat to or remove heat from the ground. The underground network is costly to install and would be difficult to repair in case of leakage or plugging up of flow underground.

SUMMARY OF INVENTION

The invention relates to a means of heating and cooling space within a structure and providing the structure with hot and cold water. A solar heating system interacts with a water supply system through a heat exchange apparatus so that water may be heated simultaneously with the heating or cooling of the structure. The water supply system includes a cold ground well at ground ambient temperature providing water for drinking and other general household purposes, and a hot ground well at a higher temperature providing water for general household uses such as bathing. Additionally, the cold ground well supplies water to the heat exchangers for cooling the structure and the hot ground well supplies water to the heat exchangers for heating the structure whenever the solar heating system needs supplementation.

An object of the invention is to provide a heat pump system with a hot ground well reservoir for storing heat energy over long periods of time so that summer solar heat can be stored and used in the winter months. A further object of the invention is to provide a heating system with structure that increases the economically feasible size of a heat storage area designed to provide a structure with heat energy in conjunction with solar heat energy. Another object of the invention is to reduce the perimeter heat loss from a heat storage area by providing a low temperature gradient proximate to the area. Yet another object is to provide a simple, durable and efficient heat storage area requiring a minimum of space within the structure. Another object is to minimize the need for an auxiliary power source to augment the space heating of the solar energy system. A further objective is to minimize the need for a household water heating system in addition to the heating system through use of an open system in which ground well water is used both as a structure heating and cooling means and as the household water supply. A still further objective is to provide heat exchange means allowing the heating of water simultaneously with the heating or cooling of the structure. Yet another object of the invention is to provide a solar heating and cooling system that has low operation cost, long life, minimum maintenance and high efficiency. These and other objects and advantages of the invention are found in the following specification of a preferred embodiment of the invention.

IN THE DRAWINGS

FIG. 2 is a vertical sectional view of the heat exchange apparatus and piping leading thereto and therefrom;

Figure 1:
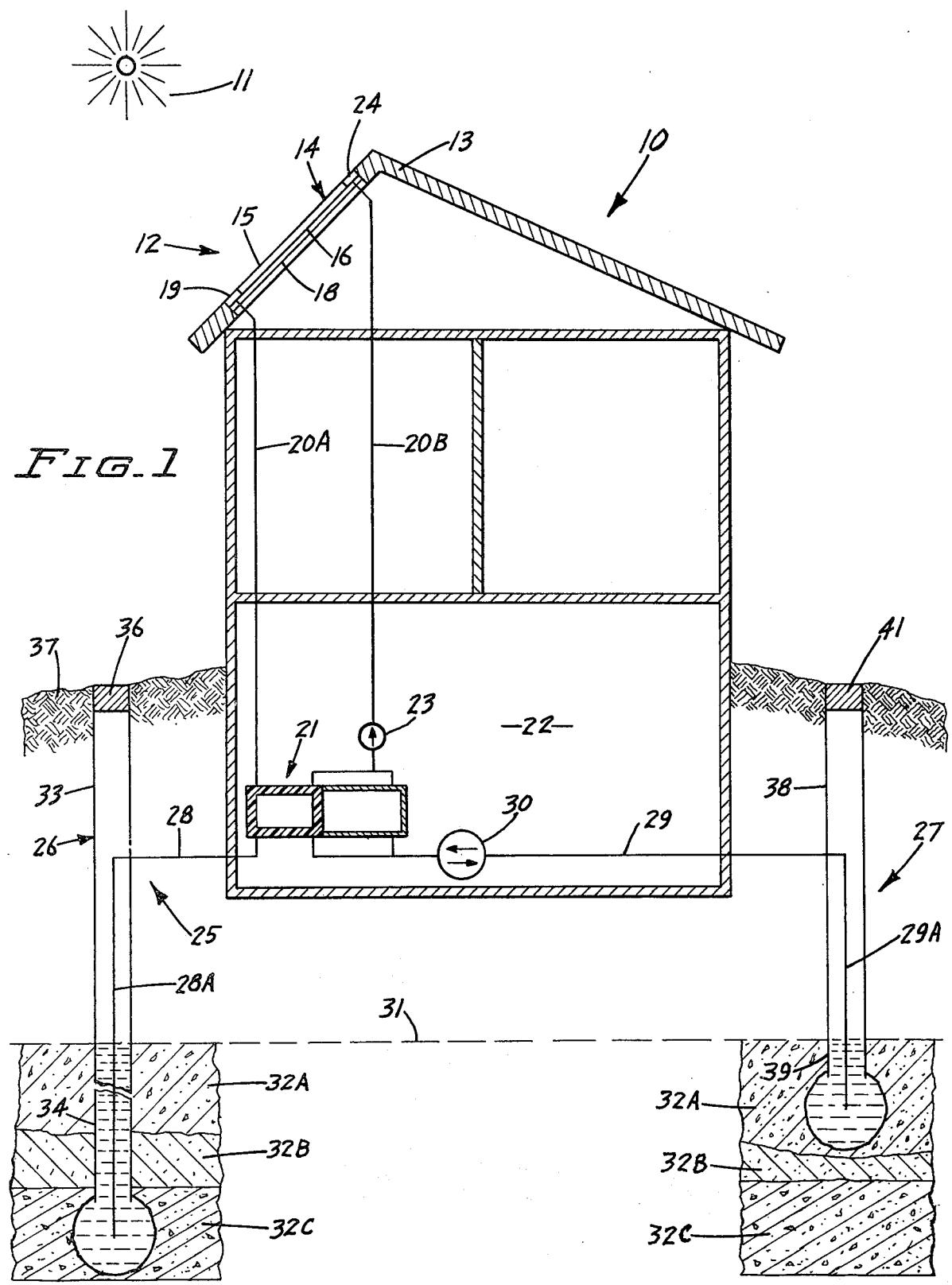
FIG. 1 is a vertical sectional view of a structure and the principal elements of the heating and cooling system of the invention.

FIG. 3 schematically represents flow of the solar heating fluid and water through the first and second heat exchanger;

FIG. 4 schematically represents flow of solar heating fluid through both heat exchangers and flow of water through the first heat exchanger only;

FIG. 5 schematically represents flow of solar heating fluid through the first heat exchanger only and flow of water through both heat exchangers; and FIG. 6 schematically represents flow of solar heating fluid and water through the first heat exchanger only.

DESCRIPTION OF PREFERRED EMBODIMENT:

Referring to the drawing, there is shown in FIG. 1 a structure 10 capable of receiving solar radiation 11. Structure 10 is shown as a residential house having a number of rooms. Other structures, as greenhouses, commercial buildings, and the like, can be temperature controlled with the environment control system of the invention.

The environment control system of the invention has a solar heating system shown generally at 12. Structure 11 has a roof 13 supporting a solar collector 14. An example of a suitable collector is shown in U.S. Pat. No. 3,387,602. In the northern hemisphere during the summer months, collector 14 is preferably mounted on the roof 13 facing due south or slightly west from due south. At 40° north latitude, the preferred angle of tilt from horizontal is 50°–60°. The solar collector can be a movable solar heat collecting device which can be positioned to take maximum advantage of the sun. The collector 14 comprises a glazing 15 which may be one or more sheets of glass or diathermanous plastic. A collector plate 16, preferably a selective or dull black surface, is located below glazing 15 for retaining solar energy and transferring heat to a solar heating fluid which is circulated through solar heating system 12. The solar heating fluid is preferably water with an antifreeze additive such as ethylene glycol. Insulation 18 between collector plate 16 and roof 13 greatly reduces heat loss to roof 13 and structure 10.

The solar heating fluid flows downwardly over the collector plate 16 into a collecting manifold 9. From collecting manifold 19, the solar heating fluid proceeds through piping 20A to heat exchange apparatus 21, preferably located in the basement 22 of structure 10.

Leaving heat exchange apparatus 21, the solar heating fluid is returned upwardly through piping 20B by a pump 23 to a distributing manifold 24 located at the top of the solar collector 14. Manifold 24 distributes the fluid over collector plate 16 whereby the solar energy elevates the temperature of the fluid. The fluid in system 25 is water. For example, fluid as water in the solar collector 14 is elevated to a temperature of 190 –200° F. on a bright sunny day.

A fluid supply system indicated generally at 25 interacts with solar heating system 12 through heat exchange apparatus 21. A heat storage ground well 26 receives hot water from heat exchange apparatus 21 and stores the hot water in the ground. The temperature of the hot water introduced into well 26 is preferably 150°–200° F. This hot water increases the temperature of the water and ground materials in the zone around the lower end of well 26.

A second cold storage ground well 27 retains water at ground ambient temperature. The cold water may be used to cool structure 10 or for drinking and the like. Wells 26 and 27 are preferably constructed at sufficient distance from one another so that any significant heat transfer between them is prevented. Wells 26 and 27 can also be at different levels. Hot well 26 is shown in FIG. 1 as extended down through a sand and gravel layer or aquifer 32A, a clay layer or aquiclude material 32B and into a second sand or gravel layer or aquifer 32C. Cold well 27 extends into first layer or aquifer 32A. In some locations there is only a single aquifer so that both wells 26 and 27 extend into this aquifer. Other locations may have numerous water bearing earth formations. The wells 26 and 27 can then be extended into separate aquifers. When more than one aquifer is present, a single well having tapped or separated openings to separate aquifers can be used for the hot water and cold water. Separate lines are used in the same well casing to carry the hot water and cold water. Piping 28 joins hot well 26 and heat exchange apparatus 21. A pipe or line 29 joins cold well 27 with heat exchange apparatus 21. When water is to be heated, it is drawn from cold ground well 27 through piping 29 by a pump 30. Pump 30 can be driven in a reverse direction to move hot water from well 26 to well 27. Entering heat exchange apparatus 21, the water receives heat energy from the solar heating fluid after which it proceeds to hot well 26 via pipe 28, displacing the cooler water already present in hot well 26. Below the water table represented by line 31, aquifer 32C surrounding hot well 26 is gradually heated by conduction of heat from warmer to cooler water and from warmer to cooler soil, by heat transfer from water to the soil, and by convection as warmer water enters the aquifer nearest the well outwardly displacing cooler water. In this manner, a gradual temperature gradient is created in the aquifer 32C proximate to the lower end of the well 26. This achieves superior heat retention as compared, for example, to underground water contained within a tank or pipe. Since ground water flow is laminar, there is very little mixing of hot and cold water layers. The hot water displaces the cold water in hot well 26.

When hot water is needed for space heating, it is drawn by pump 30 from hot well 26 through piping 28 to heat exchange apparatus 21 from which its heat is released to structure 10. The water is discharged in well 27.

Ground well 26 has a vertically disposed casing or pipe 33 extended from the surface 37 of the ground below the water table 31. The casing 33 has a lower end 34 located a considerable distance below the water table 31. The depth of the well can vary in accordance with the characteristics of the earth and water bearing earth materials. The top of casing 33 is closed with a removable plug 37. Pipe 28 leading from the heat exchange apparatus 21 has an elongated portion 28A which extends down through casing 33 and terminates at the lower end 34 of the casing.

Cold ground well 27 has a generally upright casing 38 extended into the ground. Casing 38 has a lower end 39 located below the water table 31 so that there is a reservoir of cold water always present adjacent the lower end of casing 38. Pipe or line 29 has a downwardly directed section 29A which extends down in casing 38 and terminates at the lower end of casing 38.

Wells 26 and 27 can be the conventional wells wherein a plurality of end-to-end casings are driven into the ground until they reach water bearing rock, gravel, sand or other like earth material.

FIG. 2, an enlarged sectional view of heat exchange apparatus 21, shows a first heat exchanger 42 connected to a second heat exchanger 43. The interior walls of first heat exchanger 42 are padded with thermal insulation 44 to minimize heat loss to structure 10. Conversely, second heat exchanger 43 is designed to allow heat flow to and from structure 10 and thus functions as a radiator to heat or cool structure 10 directly or in cooperation with forced air, gravity, fluid circulation or other heat circulation means. For example, heat exchanger 43 can be located in the duct system of a forced air heating arrangement.

The solar heating fluid enters heat exchange apparatus 21 at inlet 46. Within heat exchange apparatus 21 piping 47 is preferably coiled or otherwise arranged to maximize exchange of heat. Flow of solar heating fluid is directed by valve 48 with valve control means 49 located on primary line 51. A valve 52 with valve control means 53 is located on bypass line 54. With valve 48 open and valve 52 closed, the solar heating fluid flows along primary line 51 through second heat exchanger 43. With valve 48 closed and valve 52 open, the solar heating fluid flows along bypass line 54 avoiding second heat exchanger 43. Similarly, flow of water through heat exchange apparatus 21 is directed by valve 56 with valve control means 51 located on primary water line 58. A second valve 59 with valve control means 61 is located on water bypass line 62. Water is directed to flow through second heat exchanger 43 or to avoid second heat exchanger 43 in the manner of solar heating fluid control explained above. Within heat exchange apparatus 21, piping 28 is preferably coiled or otherwise arranged to maximize the exchange of heat. Other types of heat exchange structure can be used in heat exchange apparatus 21.

FIGS. 3–6 schematically represent the solar heating fluid cycle and the water cycle within heat exchange apparatus 21. Arrows indicate direction of flow. The arrangement in FIG. 3 is achieved with valves 48 and 56 open and valves 53 and 59 closed. With only water supply pump 30 operative, structure 10 is heated with hot water. With only solar heating system operative with pump 23, structure 10 is heated with solar energy. With both systems operative, maximum heating is available for occasional sunny and extremely cold days.

The arrangement in FIG. 4 is achieved with valves 48 and 59 open and valves 53 and 59 closed. With solar heating system 12 and water supply system pumps 23 and 30 operative, structure 10 and water are heated with solar energy.

The arrangement in FIG. 5 is achieved with valves 53 and 56 open and valves 48 and 59 closed. With only water supply system pump 30 operative, the structure is cooled using cold water. With both pumps 23 and 30 operative, structure 10 is cooled with cold water and water is heated with room air of structure 10 and solar energy.

The arrangement in FIG. 6 is achieved with valves 53 and 59 open and valves 48 and 56 closed. With solar heating system 12 and water supply system pumps 23 and 30 operative, water is heated.

Because it may be inferred that valve control means 49, 53, 57 and 61 are strictly manual, it is emphasized that an automated system comprising thermostatic valves in conjunction with thermostats located at solar collector 14, hot ground well 26, structure 10 and at any other desired location is within the scope of this invention.

The system can operate without the heat exchange 21 when the structure has a conventional hot water heating system. The water from wells 26 and 27 is circulated through the radiator of the heating system and solar collector 14. Cold water from cold well 27 would cool the structure and then pick up heat energy in the solar collector 14. The hot water is then pumped into hot well 26. In the winter, hot water from hot well 26 is moved through the radiators to heat the structure and then stored in the cold well 27. Solar collector 14 can be used to provide additional heat energy to the water supplied to the radiators.

It is understood that modifications, changes in materials, fluids and size of parts may be made by those skilled in the art without departing from the invention.

The embodiments of the invention in which an exclusive property or privilege is claimed are defined as follows:

1. A heat transfer system comprising: solar energy collector means having a first fluid to transfer heat energy, heat exchange apparatus receiving the first fluid from the collector means, an underground heat storage well, an underground cold storage well, first piping means connecting said solar collector means and heat exchange apparatus for conveyance of the first fluid between said collector means and heat exchange apparatus, second piping means connecting the heat storage well, cold storage well and heat exchange apparatus for conveyance of a second fluid between said wells and heat exchange apparatus, first pump means to circulate the first fluid in the first piping means between the solar energy means and heat exchange apparatus, and second pump means operable to circulate the second fluid in said piping means whereby heat energy in the first fluid is transferred to the second fluid, said heated second fluid being stored in the heat storage well.

2. The system of claim 1 wherein: the heat storage well extends down into the ground and has a lower end located below the water table line.

3. The system of claim 2 wherein: the cold storage well extends down into the ground and has a lower end located below the water table line.

4. The system of claim 1 wherein: the heat storage well has an upright casing extended down into the ground.

5. The system of claim 1 wherein: the cold storage well has an upright casing extended down into the ground.

6. The system of claim 1 wherein: the cold storage well and heat storage well each have casings extended down into the ground, said second pipe means having sections extended downwardly in each casing.

7. The system of claim 1 wherein: said second pump means is a reversible pump whereby the second fluid can be pumped to and from each well.

8. The system of claim 1 wherein: the second fluid is water.

9. The system of claim 1 wherein: the heat exchange apparatus has a first section and a second section separated from the first section, means thermally insulating the first section, first heat transfer means located in the first section having first means for receiving the first fluid from the first piping means, and second means for carrying the second fluid whereby heat energy from the first fluid is transferred to the second fluid in said first section.

10. The system of claim 9 wherein: the second section has second heat transfer means for transferring heat energy to the air surrounding the second heat transfer means.

11. The system of claim 10 wherein: the second heat transfer means has third means for carrying the first fluid and fourth means for carrying the second fluid.

12. The system of claim 11 wherein: the third means are connected to the first means and the fourth means are connected to the second means.

13. The system of claim 1 wherein: the heat exchange apparatus includes heat insulation means surrounding means for transferring heat energy from the first fluid to the second fluid.

14. A heat transfer system comprising: solar energy collector means having means to collect and transfer heat energy, a heat storage ground well, heat exchange means for receiving heat energy from the means to collect and transfer heat energy, means for storing a fluid comprising a second ground well, piping means connecting the second ground well, the heat exchange means and heat storage ground well, and means to move the fluid through the piping means from the second ground well to the heat exchange means and heat storage ground well whereby the heat energy in the heat exchange means from the solar collector means is transferred to the fluid and stored in the heat storage ground well.

15. The system of claim 14 wherein: the heat exchange means has a section operable to transfer heat energy to a second fluid, said means to move the fluid being operable to draw the heated fluid from the heat storage ground well through the heat exchange means and back into the means for storing a fluid.

16. The system of claim 14 wherein: the second ground well extends down into the ground and has a lower end located below the water table line.

17. The system of claim 14 wherein: the heat storage ground well extends down into the ground and has a lower end located below the water table line.

18. The system of claim 17 wherein: the heat storage ground well has an upright casing extended down into the ground.

19. The system of claim 18 including: fluid carrying means extended downwardly in the upright casing and forming part of the piping means connecting the means for storing a second fluid with the heat exchange means and heat storage ground well.

20. A heat transfer system comprising: solar energy collector means having means to collect and transfer heat energy, a heat storage ground well, heat exchange means for receiving heat energy from the means to collect and transfer heat energy, means for storing a fluid, piping means connecting the means for storing a fluid, the heat exchange means and heat storage ground well, and means to move the fluid through the piping means from the means for storing the fluid to the heat exchange means and ground well whereby the solar energy in the heat exchange means from the solar collector means is transferred to the fluid and stored in the heat storage ground well, said means to move the fluid including a reversible pump whereby the fluid can be moved from the means for storing the fluid to the heat storage ground well and from the heat storage ground well to the means for storing a fluid.

21. A heat transfer system comprising: solar energy collector means having means to collect and transfer heat energy, a heat storage ground well, heat exchange means for receiving heat energy from the means to collect and transfer heat energy, means for storing a fluid, piping means connecting the means for storing a fluid, the heat exchange means and heat storage ground well, and means to move the fluid through the piping means from the means for storing the fluid to the heat exchange means and ground well whereby the solar energy in the heat exchange means from the solar collector means is transferred to the fluid and stored in the heat storage ground well, said heat exchange apparatus having a first section and a second section separated from the first section, means thermally insulating the first section, first heat transfer means located in the first section having first means for receiving the solar energy from the solar energy collector means and second means for carrying the fluid whereby heat energy from the solar energy collector means is transferred to the fluid.

22. The system of claim 21 wherein: the second section has second heat transfer means for transferring heat energy to the air surrounding the second heat transfer means.

23. The system of claim 14 wherein: one of said wells is deeper than the other of said wells.

24. A heat transfer system comprising: solar energy collector means having means to collect and transfer heat energy to a fluid, an underground heat storage well, an underground cold storage well, piping means connecting said solar collector means and heat storage well and cold storage for conveying fluid between said solar energy collector means and said wells, and means to circulate the fluid between said solar energy collector means and said heat storage well and cold storage well whereby fluid heated by the solar collector means is stored in the heat storage well.

25. The system of claim 24 wherein: the heat storage well extends down into the ground and has a lower end located below the water table line and the cold storage well extends into the ground and has a lower end located below the water table line.

26. The system of claim 24 wherein: one of said wells is deeper than the other of said wells.

27. The system of claim 24 wherein: said means to move the fluid includes a pump means for pumping the fluid between said wells and said solar collector means.

* * * * *

UNITED STATES PATENT AND TRADEMARK OFFICE
CERTIFICATE OF CORRECTION

PATENT NO. : 3,965,972
DATED : June 29, 1976
INVENTOR(S) : Ross K. Petersen

It is certified that error appears in the above-identified patent and that said Letters Patent are hereby corrected as shown below:

Column 1, line 13, after "of" (first occurrence) insert --the--; after "parameters", delete "parametes".

Column 2, line 65, "9" should be --19--.

Column 5, line 2, "59" (first occurrence) should be --56--.

Column 5, line 24, "exchange" should be --exchanger--.

Signed and Sealed this

Twenty-sixth Day of October 1976

[SEAL]

Attest:

RUTH C. MASON
Attesting Officer

C. MARSHALL DANN
Commissioner of Patents and Trademarks